(No Model.)
T. R. FERRALL.
ANTI FRICTION BEARING.
No. 399,662. Patented Mar. 19, 1889.
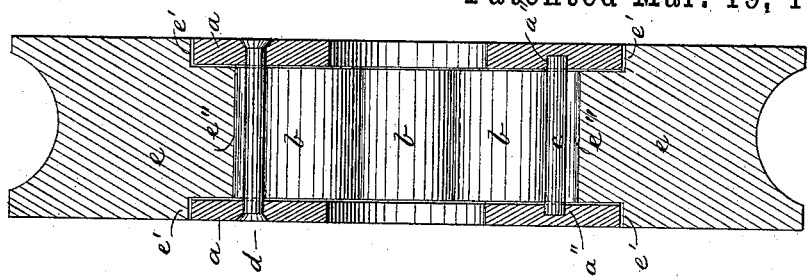
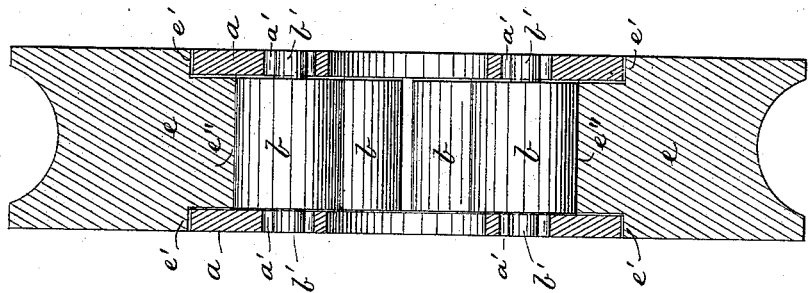
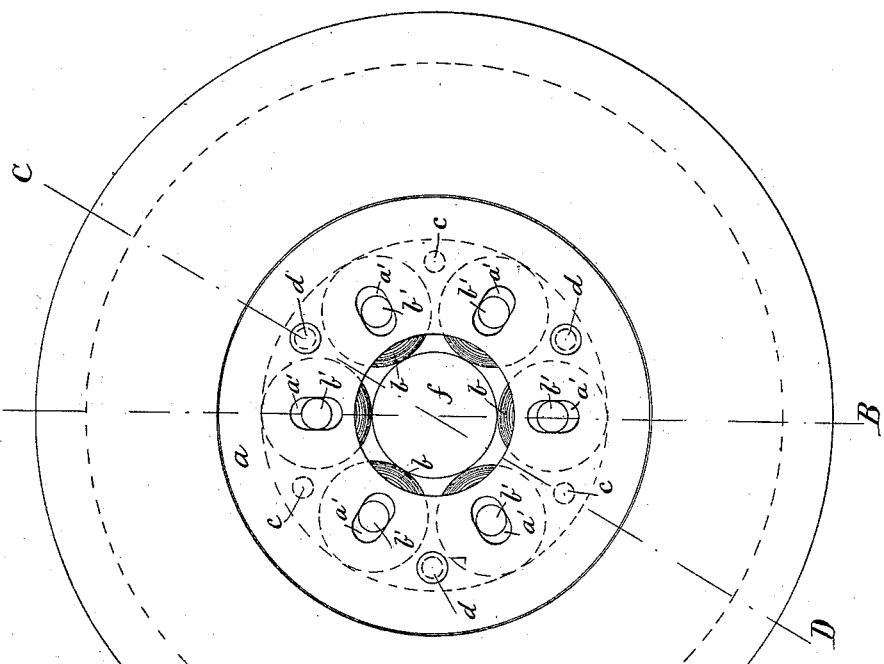
Witnesses.
Carl A. Andrén,
Selma R. Schelin.
Inventor.
Thomas R. Ferrall,
by Alban Andrén
his atty.

UNITED STATES PATENT OFFICE.

THOMAS R. FERRALL, OF BOSTON, MASSACHUSETTS.

ANTI-FRICTION BEARING.

SPECIFICATION forming part of Letters Patent No. 399,662, dated March 19, 1889.

Application filed September 5, 1888. Serial No. 284,638. (No model.)

*To all whom it may concern:*

Be it known that I, THOMAS R. FERRALL, a citizen of the United States, and a resident of Boston, in the county of Suffolk and State of Massachusetts, have invented new and useful Improvements in Anti-Friction Bearings, of which the following, taken in connection with the accompanying drawings, is a specification.

This invention relates to improvements in anti-friction bearings for pulley-blocks and other purposes, and it is carried out as follows, reference being had to the accompanying drawings, wherein—

Figure 1 represents an end elevation of the improved anti-friction bearing shown as applied to a sheave. Figs. 2 and 3 represent, respectively, cross-sections on the lines A B and C D in Fig. 1, a part of the interior mechanism being shown in elevation.

Similar letters refer to similar parts wherever they occur on the different parts of the drawings.

The improved anti-friction bearing is composed of a pair of annular metal washers, $a\ a$, through each of which is made a series of radially-slotted perforations, $a'\ a'\ a'$, in which are loosely journaled the end trunnions, $b'\ b'\ b'$, of the anti-friction rollers $b\ b\ b$, as shown in the drawings. The perforated washers $a\ a$ are held together at a proper distance apart, so as to permit a free rotary motion of the said anti-friction rolls, as follows: In a six-roller bearing, as shown in the drawings, I use three stay bolts or wires, $c\ c\ c$, the ends of which are adapted to rest in recesses $a''\ a''\ a''$ on the interior of said washers $a\ a$, as shown in Fig. 3, and said stay-bolts serve the purpose of keeping the perforated washers $a\ a$ at a proper distance apart. In connection with such stay bolts or wires I use an equal number of rivets, $d\ d\ d$, passing through perforations in the plates $a\ a$ and riveted to the same, as fully shown in Figs. 1 and 3, which rivets serve to prevent the washers $a\ a$ from spreading apart. This is a very simple and effective, as well as cheap and durable manner of securing the plates $a\ a$ together at the desired distance apart. Heretofore a series of rivets have been used for this purpose, such rivets having reduced ends with shoulders or offsets to serve as abutments against the insides of the washers $a\ a;$ but such particularly-prepared rivets being costly to manufacture are for this reason objectionable. Besides being necessarily heavy, they add unnecessary weight to the structure.

With my arrangement of plain stay-bolts and rivets I am enabled to use for this purpose common round wires, which renders the device light, cheap, and very durable.

In the drawings I have represented my improved anti-friction device as applied to a sheave, $e;$ but this is not essential, as it may to equal advantage be used within a wheel, roller, or bearing, or for any other purpose where an anti-friction device is desirable. The ends of the said sheave $e$ are shown as having recesses $e'\ e'$ adapted to receive the outer portions of the washers $a\ a$, as shown in the drawings; but this is not essential.

$f$ in Fig. 1 represents the central pin or shaft around which the anti-friction rolls $b\ b\ b$ travel and rotate when the sheave is turned around its axis or the said pin or shaft rotated, as the case may be. The anti-friction rollers $b\ b\ b$ are arranged within a cylindrical recess, $e''$, in the center of the sheave $e$, as shown in the drawings, and during the rotation of the said sheave or the pin or shaft $f$ the exterior parts of the said rollers $b\ b$ roll against the cylindrical surface of said recess $e''$.

The object of the slotted perforations $a'\ a'\ a'$ in the washers $a\ a$ is to permit an automatic radial adjustment of said rollers $b\ b\ b$, so as to cause said rollers to lie in rolling contact with both the central pin shaft, $f$, and the cylindrical central perforation, $e''$, in the sheave $e$, and such automatic radial adjustment of the rollers $b\ b\ b$ is very essential for the purpose of taking up and compensating for any wear on the spindle, rollers, or sheave.

The invention is very simple, strong, and durable, and is applicable for all purposes where an anti-friction rolling device is desired.

Having thus fully described the nature, construction, and operation of my invention, I wish to secure by Letters Patent and claim—

1. In an anti-friction bearing, a pair of perforated washers, $a\ a$, and a series of anti-friction rollers journaled in perforations in said washers, combined with a series of stay bolts or wires, $c\ c\ c$, having their ends resting in recesses $a''\ a''$ on the inside of the washers $a\ a$, and a series of rivets, $d\ d\ d$, riveted to the said washers, substantially as and for the purpose set forth.

2. In an anti-friction bearing, the metal washers $a\ a$, having the radial perforations $a'\ a'\ a'$, as described, and having the anti-friction rollers $b\ b\ b$ loosely journaled in said perforations, combined with the alternate stay bolts or wires $c\ c$ and rivets $d\ d$, substantially as and for the purpose set forth.

3. The radially-perforated annular metal washers $a\ a$ and the anti-friction rollers $b\ b$, having their end trunnions, $b'\ b'$, loosely journaled in said perforated washers, combined with the centrally-perforated part $e$, and the washer-holding device consisting of alternate stay bolts or wires $c\ c\ c$, having their ends resting in recesses on the interior of the washers $a\ a$, and the rivets $d\ d\ d$, substantially in a manner and for the purpose as specified.

In testimony whereof I have signed my name to this specification, in the presence of two subscribing witnesses, on this 4th day of September, A. D. 1888.

THOMAS R. FERRALL.

Witnesses:
 ALBAN ANDRÉN,
 E. O. LOUD.